United States Patent [19]
James et al.

[11] Patent Number: 4,947,167
[45] Date of Patent: Aug. 7, 1990

[54] APPARATUS FOR GENERATING SYNCHRO/RESOLVER STIMULUS SIGNALS

[75] Inventors: Robert L. James, Bloomfield; Jacob H. Malka, Fair Lawn, both of N.J.

[73] Assignee: Allied-Signal Inc., Morris Township, Morris County, N.J.

[21] Appl. No.: 202,343

[22] Filed: Jun. 6, 1988

[51] Int. Cl.⁵ .............................. H03M 1/48
[52] U.S. Cl. .................. 341/117; 324/158 SY
[58] Field of Search ............... 341/112, 115, 117, 147; 324/158 SY

[56] References Cited

U.S. PATENT DOCUMENTS 4,160,245 7/1979 Scott ................................. 341/117
4,320,391 3/1982 Mallett .............................. 341/117
4,703,307 10/1987 James et al. ...................... 341/117

Primary Examiner—William M. Shoop, Jr.
Assistant Examiner—Marc S. Hoff
Attorney, Agent, or Firm—Howard G. Massung; Robert A. Walsh

[57] ABSTRACT

Apparatus for generating synchro/resolver stimulus signals is disclosed wherein the stimulus signals are generated in an arbitrary time sequence of synchro/resolver shaft angles under control of an external computer. Data from the computer is applied to random access memory (RAM) banks and is read out from sequential RAM address locations at a predetermined rate to two independent digital to synchro/resolver converters. The converter outputs correspond to synchro/resolver shaft angle information in a three or four wire AC output format.

10 Claims, 2 Drawing Sheets

APPARATUS FOR GENERATING SYNCHRO/RESOLVER STIMULUS SIGNALS

BACKGROUND OF THE INVENTION

Automatic test equipment such as, for example, that used for testing avionics systems, requires internally generated stimuli corresponding to particular parameters to be tested. A common parameter to be tested by test equipment of the type described is synchro/resolver shaft angle, i.e. the angular position of a synchro/resolver shaft. Prior to the present invention apparatus for generating synchro/resolver shaft angle stimuli has been somewhat cumbersome, requiring complicated circuitry including switching arrangements and the like. This has been particularly true when stimuli corresponding to various shaft angles need to be generated.

Commonly assigned U.S. Pat. No. 4,703,307 issued on Oct. 27, 1987 to the present inventors contemplates apparatus of the type described including a plurality of channels each having a digital to synchro/resolver converter for converting digital signals to AC analog synchro/resolver signals, and at least one channel having a synchro/resolver to digital converter for converting the analog signals to digital signals for measurement purposes. The digital to synchro/resolver converters are responsive to digital signals containing different shaft angle information, and to an AC reference signal which provides a carrier for the analog signals. Each of the digital to synchro/resolver converters is independently controlled and simultaneously operated to provide output analog signals with different shaft angle information; different carrier signal phase angles; and different output amplitudes. Computer interface logic generates control signals for controlling the apparatus in accordance with the above.

The present invention, on the other hand, relates to apparatus comprising analog and digital components for generating synchro/resolver stimulus signals in any arbitrary shaft angle sequence automatically and under control of an external computer interface logic. The disclosed configuration features solid state implementation, thus eliminating electrical/mechanical components. The configuration achieves relatively high resolution and repeatability as is desirable for the purposes described. Moreover, the invention features a self-test capability for "wrap-around" testing of the stimulus signals to insure the integrity of the apparatus, as required for the aforenoted applications.

Accordingly, it is the object of the present invention to provide apparatus for generating synchro/resolver stimulus signals with high resolution and repeatability characteristics and including self-test capability.

SUMMARY OF THE INVENTION

This invention contemplates apparatus for generating synchro/resolver stimulus signals, wherein data from an external computer is applied through computer interface logic to resident random access memory (RAM) banks and read out from sequential RAM address locations at a predetermined rate to two independent stimulus digital to synchro/resolver converters which provide analog AC signals corresponding to sychro/resolver shaft angle information in a three or four wire output format.

One of the RAM banks provides a time sequence of synchronizing signals to designate the occurrences for any desired points on the waveforms for the aforenoted shaft angle signals. This RAM bank also sequences out data for two special signals, i.e. tachometer and amplitude signals. The tachometer signal is a two wire AC carrier output signal, modulated with the angular velocity of one of the aforementioned shaft angle signals. The amplitude signal is a two wire DC analog signal having an amplitude which is a function of time and represents the corresponding shaft angle at those instances of the shaft angle signals.

Self-test features are provided including a "wrap-around" resident synchro/resolver to digital converter channel which reads back to the computer any shaft angle signals, or a sequence of such signals, being delivered by the converters.

DETAILED DESCRIPTION OF THE INVENTION

Figure 1:
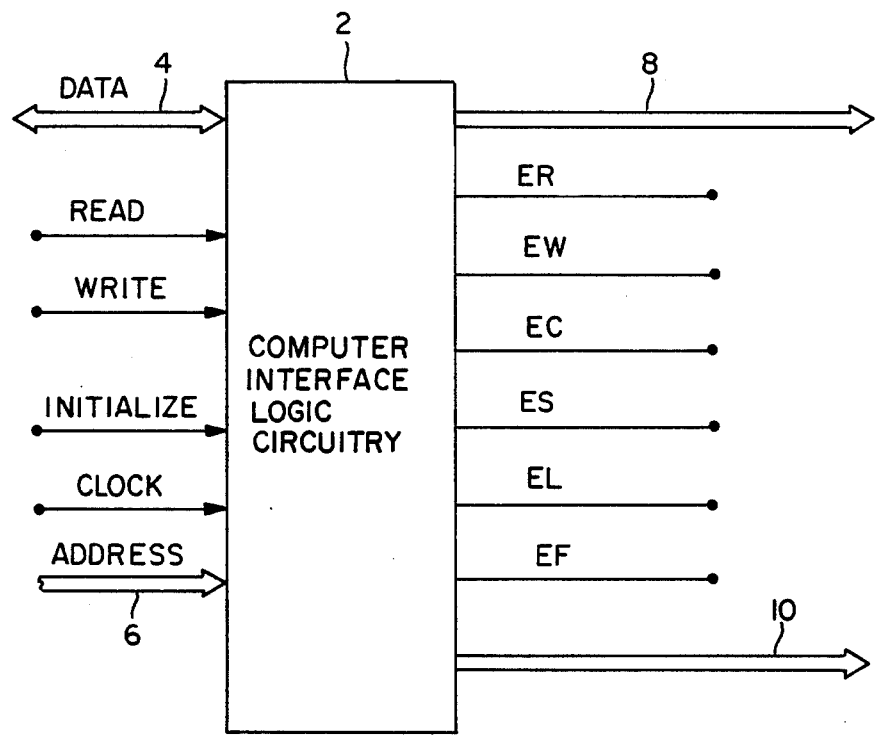
FIG. 1 is a block diagram illustrating a computer interface feature of the invention.

With reference first to FIG. 1, computer interface logic circuitry is designated by the numeral 2. Interface logic circuitry 2 communicates with a computer (not otherwise shown) via an external input/output data bus 4 and an external address bus 6, and receives read, write, initialize and clock commands from the computer. Computer interface logic circuitry 2 is responsive to the inputs applied over buses 4 and 6 and to the read, write, initialize and clock commands for providing control signals including a read signal ER, a write signal EW, a configuration control signal EC, a chip select signal ES, a relay control signal EL, and a synchro/resolver format control signal EF, and which control signals have a purpose which will hereinafter become evident. Computer interface logic circuitry 2 communicates with the disclosed apparatus via an internal buffered input/output data bus 8 and an internal buffered address bus 10.

Figure 2:
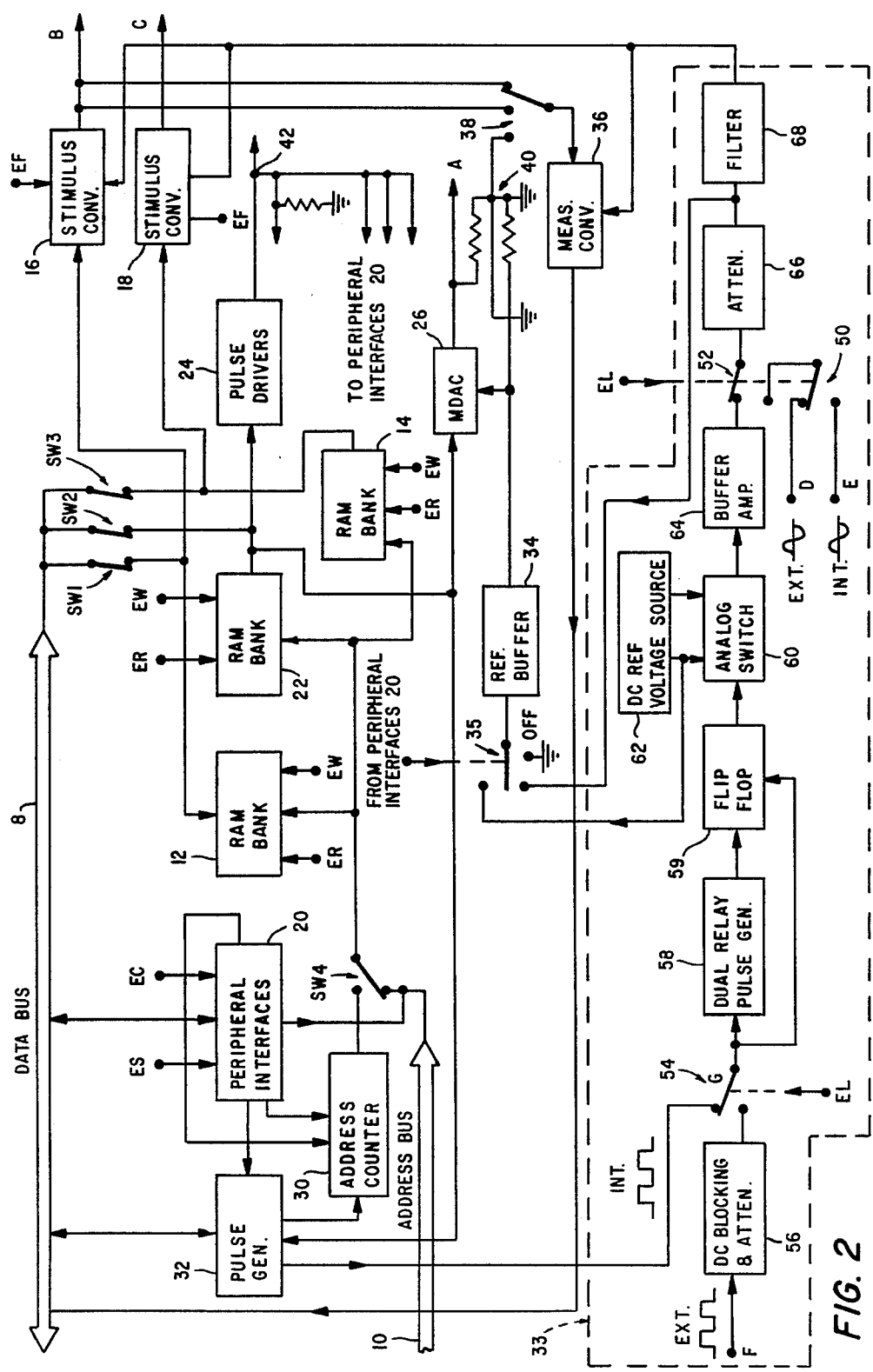
FIG. 2 is a block diagram-electrical schematic illustrating the invention.

With reference to FIG. 2, a RAM bank 12 and a RAM bank 14 are connected to computer interface logic circuitry 2, whereby digital synchro/resolver shaft angle position data is written into the RAM banks during a "programming" phase of operation, and is sequentially read out of said RAM banks during a "sequencing" phase of operation to provide an arbitrary function of synchro/resolver shaft angle v. time at the inputs to digital to stimulus converters 16 and 18. RAM banks 12 and 14, which are controlled by read signal ER and write signal, EW receive the written data via buffered data bus 8 and receive appropriate addresses via buffered address bus 10 and switch SW4 as particularly shown in FIG. 2.

Computer interface logic circuitry 2, in addition to appropriate buffer hardware and read/write logic gates, has address controlled chip select hardware that decides, by providing chip select signal ES, when particular hardware chips are to be enabled, one at a time. Thus, an arrangement of dual peripheral interfaces 20 is selected by computer interface logic circuitry 2 via chip select signal ES so as to be programmed via data and address buses 8 and 10 to produce up to forty-eight separate logic "1" or logic "0" latched output signals for latched control of hardware in the disclosed arrangement, in accordance with configuration control signal EC.

For example, normally open switch SW4 and normally closed switches SW1, SW2 and SW3 are switched to fixed open or closed states by these latched logic signals to direct the signal paths of data and addresses in programming RAM banks 12 and 14 as will now be discerned with reference to FIG. 2.

A RAM bank 22 is similarly controlled via computer interface logic circuitry 2, but with data to be sequenced out into an arrangement of four synchronizing pulse drivers 24 and into a multiplying digital to analog converter (MDAC) 26. MDAC 26 provides tachometer and analog amplitude two wire type output signals at a designation A shown in the Figure.

After RAM banks 12, 14 and 22 are thus programmed, the disclosed apparatus commences the "sequencing" phase of operation. Thus, computer interface circuitry 2, by changing the latched output control signal logic levels from peripheral interfaces 20, opens switches SW1, SW2 and SW3 and closes switch SW4 to put RAM banks 12, 14 and 22 into a fixed read-out mode. Computer interface logic circuitry 2 generates sequential addresses to the RAM banks via switch SW4 which, when closed is connected to an address counter 30. Address counter 30 is driven by a turned-on pulse generator 32. Pulse generator 32 is, in effect, a programmable counter of clock pulses as will now be understood and is turned on by interface 2 via data applied over bus 8.

The aforenoted interaction causes streams of data to be read out from RAM banks 12, 14 and 22 by sequential addresses to the RAM banks and to be delivered to converters 16 and 18, the outputs of which at B and C are AC synchro/resolver stimulus signals in a three or four wire format, as the case may be, and in accordance with format control signal EF, and to pulse drivers 24 and MDAC 26 as shown in FIG. 2, at a rate depending on the programmed pulse frequency of pulse generator 32

In order to provide the aforenoted stimulus signals, converters 16 and 18 require an AC reference signal input. This AC reference signal input produces the "carrier" portion of the stimulus signals. Although supplied from external sources, this AC reference signal needs conditioning via circuitry 33 to provide desired phase shift, waveform shaping and time delay, as well as adjustment of amplitude for levels required by MDAC 26 in order to provide the carrier portion of the tachometer output signal heretofore referred to. The conditioning circuitry further provides a precision DC reference needed for MDAC scale factor and the AC bias portion of the analog output signal from MDAC 26 heretofore referred to. A reference buffer 34 adjusts the gains of the aforenoted references.

A self-test measurement converter 36 provides "wraparound" testing of stimulus signals and MDAC test outputs via a relay multiplexer arrangement 38 and MDAC test outputs 40.

Thus, pulse outputs from pulse drivers 24 are tested as data bit signals provided at 42. These data bit signals are fed back through peripheral interfaces 20 to data bus 8, and then via computer interface logic circuitry 2 to the aforementioned computer for evaluation With particular reference to signal conditioning circuitry 33, the circuitry can accept two types of external and internal AC reference signals, i.e. AC sidewave signals having amplitudes of, for example, 115 volts or 26 volts RMS at a frequency of 400 Hz as at D and E, or two types of external and internal squarewave reference signals as at F and G. Thus, one squarewave reference signal (F) is applied externally to the disclosed apparatus and has, for example, a 25 volt peak typical amplitude at a frequency of 1399 Hz and a DC component of +24.5 volts. The other squarewave reference signal (G) is, for example, a 50—50 duty cycle train having TTL voltage levels and generated internally by peripheral interfaces 20 via pulse generator 32. This signal is controllable in its repetition rate by the external computer via computer interface logic circuitry 2, and is used as a test signal for internal self-testing of the disclosed apparatus.

Selection between the aforenoted squarewave and AC reference input signals is computer controlled by relays 50, 52 and 54 via relay control signal EL.

To be usable, the external squarewave reference signal must have its DC component removed which is accomplished by a DC blocking and attenuating device 56 using a blocking capacitor, a resistor-diode limiter and logic gates as will now be understood by those skilled in the art.

A requirement for both types of the aforenoted squarewave reference signals is to have the signals delayed by, for example, fifteen microseconds. This is accomplished by a dual delay pulse generator 58 and a flip-flop 59 arranged as shown in the Figure. This arrangement reforms, for example, a fifty-fifty squarewave output to provide a precise AC squarewave with a + or −10 volt amplitude and negligible effect from the TTL squarewave output of flip-flop 59. The flip-flop output drives an analog switch 60 which switches alternately between, for example, + and −10 volt outputs from a precision DC reference voltage provided by a reference voltage source 62. Negligible contact voltage drop error, which might otherwise be caused by this analog switching, is achieved by a high input impedance buffer amplifier 64. When selected by relay 52, this precision squarewave reference is attenuated by an attenuator 66 to, for example, a 3.4 volt peak amplitude required for use as the AC voltage reference for MDAC 26. A switch 35 operated by data bits from peripheral interfaces 20 connects reference buffer 34 to reference buffer 34 to reference voltage source 62 or to attenuator 66, as the case may be.

Finally, a filter 68 applies a small amount of filtering to the reference voltage before passing it on as an AC reference input to converters 16 and 18 and to converter 36 via multiplexer arrangement 38.

It will now be understood that the novelty of the invention resides in the arrangement of the several components and not in the components themselves. The several components are commercially available in solid state configuration so as not to cause undue experimentation in practicing the invention, as will be readily recognized by those skilled in the art.

What is claimed is:

1. Apparatus for generating synchro/resolver stimulus signals, comprising:
   interface means for providing digital signals and for providing a plurality of control signals;
   memory means connected to the interface means and responsive to a first of the control signals so that digital signals corresponding to synchro/resolver shaft angle position data provided by the interface means are written into said memory means;

the memory means being responsive to a second of the plurality of control signals so that said data signals are sequentially read out of said memory means at a rate corresponding to a function of synchro/resolver shaft angle versus time; and converter means connected to the interface means and to the memory means and responsive to a third of the plurality of control signals for converting the signals read out of the memory means into synchro/resolver stimulus signals.

2. Apparatus as described by claim 1, including:

means connected to the interface means and to the memory means and responsive to a fourth and a fifth of the plurality of control signals for directing the digital data signals to the memory means to be written therein.

3. Apparatus as described by claim 2, wherein the signal directing means includes:

means selected by the fourth control signal for providing latching signals at a first logic level in accordance with the fifth control signal; and means latched by the latching signals at said logic level for directing the digital data signals to the memory means.

4. Apparatus as described by claim 3, wherein:

digital address signals provided by the interface means are directed to the memory means by the directing means for addressing said memory means so that the digital data signals are written therein.

5. Apparatus as described by claim 4, including:

other memory means connected to the interface means and responsive to the first control signal so that the digital signals corresponding to synchro/resolver shaft angle position data provided by the interface means can be written into said other memory means;

the digital address signals provided by the interface means being directed to the other memory means by the directing means for addressing said other memory means so that the digital data signals are written therein;

said other memory means being responsive to the second of the plurality of control signals so that said data signals are sequentially read out of said memory means as the function of synchro/resolver shaft angle versus time; and means connected to the other memory means and responsive to the read out signals for providing a first output signal which is an AC carrier signal and a second output signal which is a DC analog signal corresponding to synchro/resolver shaft angle position at those instances of the sequentially read out signals.

6. Apparatus as described by claim 5, wherein:

the means selected by the fourth control signal for providing latching signals provides said latching signals at a second logic level;

the means latched by the latching signals being latched by said latching signals at the second logic level for providing control signals; and the first mentioned memory means and the other memory means being connected to the latched means and responsive to the control signals therefrom for being rendered in a read out mode.

7. Apparatus as described by claim 5, including:

means connected to the converter means, to the means for providing the first output signal and the second output signal and to the interface means, and responsive to the synchro/resolver stimulus signals from the converters and to the first and second output signals for providing "wraparound" testing of the stimulus signals and the output signals.

8. Apparatus as described by claim 5, including:

means connected to the converter means for providing a reference signal which provides a carrier portion of the synchro/resolver stimulus signals therefrom; and means for conditioning the reference signal and connected to the converter means for applying the conditioned reference signal thereto.

9. Apparatus as described by claim 8, including:

the reference signal being one signal of an externally provided squarewave signal, an internally generated squarewave signal, an externally provided sinusoidal signal and an internally generated sinusoidal signal; and relay means connected to the interface means and operated by a sixth of the plurality of control signals for selecting the one of the reference signals and for applying the selected reference signal to the conditioning means.

10. Apparatus as described by claim 8, including:

means for applying the conditioned reference signal to the means for providing the first and second output signals for providing a carrier portion of the first output signal.

* * * * *